United States Patent [19]

Kim

[11] Patent Number: 5,369,438
[45] Date of Patent: Nov. 29, 1994

[54] APPARATUS FOR PROCESSING IMAGE MOTION COMPENSATION INFORMATION FOR AN IMAGE PROCESSING SYSTEM

[75] Inventor: Si J. Kim, Seoul, Rep. of Korea

[73] Assignee: Goldstar Co., Ltd., Seoul, Rep. of Korea

[21] Appl. No.: 62,192

[22] Filed: May 17, 1993

[30] Foreign Application Priority Data

May 19, 1992 [KR] Rep. of Korea ............... 1992-8410

[51] Int. Cl.⁵ .................. H04N 7/133; H04N 7/137
[52] U.S. Cl. .................... 348/402; 364/787
[58] Field of Search ........... 348/402, 407; 364/786, 364/787; H04N 7/133, 7/137

[56] References Cited

U.S. PATENT DOCUMENTS 4,985,768  1/1991  Sugiyama ................... 348/402
5,057,918 10/1991  Denoyelle .................. 348/402

Primary Examiner—Howard W. Britton
Attorney, Agent, or Firm—Poms, Smith, Lande & Rose

[57] ABSTRACT

An apparatus for processing image motion compensation information for an image processing system, which can add image motion compensation information and assign the bit number suitable for a specific data size required in signal processing added data with a simple structure. The apparatus includes an adding section for adding an inputted difference data per block and a data previously stored in a frame memory, an overflow/underflow checking section for checking overflow/underflow of summed data and reducing the bit size of the added data, and an overflow/underflow executing section for output-controlling the added data according to the checked overflow/underflow.

8 Claims, 5 Drawing Sheets

| IMSB | MMSB | CARRY | MSB | DESIRED SIGN | OUTPUT (3BIT) | REMARKS |
|---|---|---|---|---|---|---|
| 0 | 0 | 0 | 0 | 0 | X | |
| 0 | 0 | 0 | 1 → 0 | | ALL 1 | → OVERFLOW |
| 0 | 1 | 0 | 1 | 1 | X | |
| 0 | 1 | 1 | 0 | 0 | X | |
| 1 | 0 | 0 | 1 | 1 | X | |
| 1 | 0 | 1 | 0 | 0 | X | |
| 1 | 1 | 1 | 1 | 1 | X | |
| 1 | 1 | 1 | 0 → 1 | | ALL 2 | → UNDERFLOW |

| IMSB \ MMSB·A4 | 00 | 01 | 11 | 10 |
|---|---|---|---|---|
| 0 | | | 1 | |
| 1 | | 1 | 1 | 1 |

FIG. 5
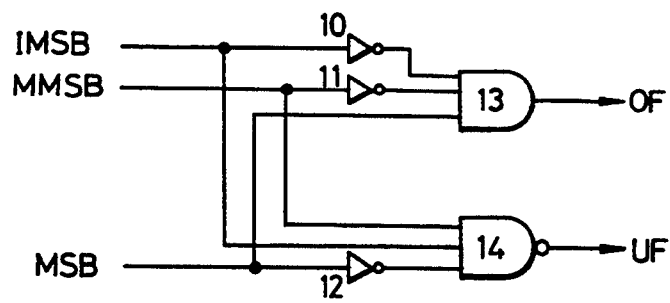
FIG. 6A
| SIGN | A3 | SIGN | DATA | |
|---|---|---|---|---|
| 0 | 1 | → 0 | ALL 1 | → OVERFLOW |
| 1 | 0 | → 1 | ALL 2 | → UNDERFLOW |
FIG. 6B
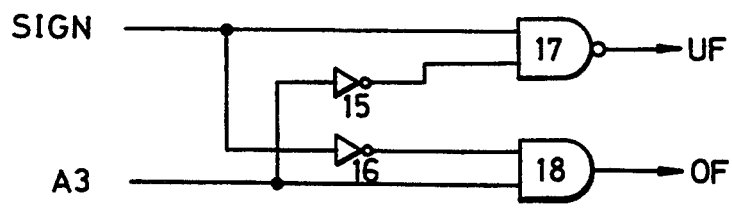

- WHEN UF IS '0', ALL OUTPUTS ARE '0'.
- WHEN OF IS '1', ALL OUTPUTS ARE '1'.

APPARATUS FOR PROCESSING IMAGE MOTION COMPENSATION INFORMATION FOR AN IMAGE PROCESSING SYSTEM

BACKGROUND OF THE INVENTION

1. Field of the Invention

The present invention relates to an apparatus for processing image motion compensation information for an image processing system, and more particularly to an apparatus for processing image motion compensation information for an image decoder of a high definition television (hereinafter referred to as HDTV) which can obtain motion-compensated image signal data by adding image motion compensation information and assign a corresponding bit number to added data so as to meet a specific data size which will be required in later signal process.

2. Description of the Prior Art

An image encoder of an HDTV detects image motion information per block and transmits motion distance information and difference signal per block. An image decoder reads a data moved as much as the motion distance information among image data previously memorized per frame by utilizing the motion distance information and the difference signal provided from the image encoder, and adds the read data to inputted image data, thereby obtaining motion-compensated image signal.

The added image data for motion compensation should be bit-assigned in order to reduce the bit size thereof to be suitable for later signal process. For example, it is required that 9-bit inputted difference signal data per block and 8-bit data from image frame memory are added and then the size of the 9-bit added data are reduced into 8-bit data. In this case, all data are structured as two's conplement data, and in particular, a color signal is motion-compensated as 8-bit data including a sign bit.

Conventionally, there has been a problem in that data processing for adding image motion compensation information or assigning the required bit size to motion-compensated image data cannot be performed sequentially and each processing circuit has a complicated structure.

SUMMARY OF THE INVENTION

It is an object of the present invention to provide an apparatus for processing image motion compensation information which can simplify its structure by adding an inputted difference signal data per block and a frame memory data previously stored per frame, checking overflow/underflow from the added result, determining a sign bit according to the checked result and assigning a suitable bit size to the final data.

In order to achieve above the object, the present invention provides an apparatus for processing image motion compensation information for an image processing system comprising:

means for adding an inverse quantized data for motion-compensation and a frame memory data;
means for determining a sign bit of the added data;
means for checking overflow/underflow of the added data and reducing the bit size of the added data according to the checked overflow/underflow;
overflow/underflow executing means for output-controlling the added data according to the checked overflow/underflow; and
latch means for providing final data by adding the sign bit to overflow/underflow executed data

BRIEF DESCRIPTION OF THE DRAWINGS

The above object and other advantages of the present invention will become more apparent by describing the preferred embodiment thereof with reference to the accompanying drawings, in which:

FIG. 5 shows a gate circuit of the overflow/underflow checking logic according to the present invention.

FIG. 6A is a table of bit reducing logic according to the present invention.

FIG. 6B shows a gate circuit of the logic of FIG. 6A.

DETAILED DESCRIPTION OF THE PREFERRED EMBODIMENT

Figures 1, 2:
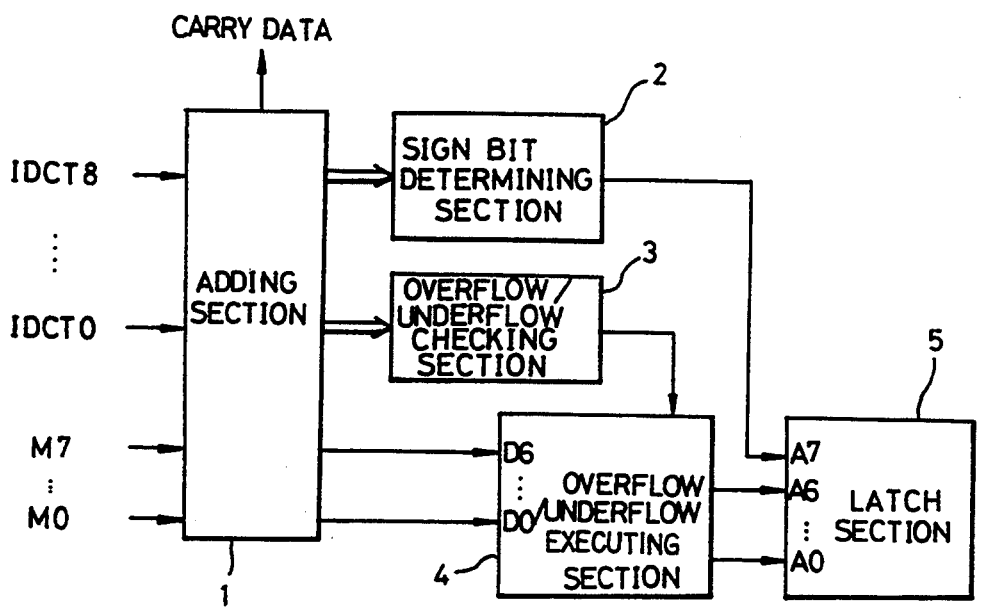
FIG. 1 is a block diagram of an apparatus for processing image motion compensation information according to the present invention.
FIG. 2 is an exemplary table explaining data adding operation according to the present invention.

With reference to FIG. 1, an apparatus for processing image motion compensation information of the present invention comprises a section 1 for adding an inverse quantized input data for motion-compensation and a memory data stored per frame, and a section 2 for determining sign bit of the added data. The present apparatus also includes a section 3 for checking overflow/underflow of the added data and reducing the bit size of the added data according to the checked result, an overflow/underflow executing section 4 for output-controlling the added data according to the checked overflow/underflow, and a latch section 5 for providing final data by adding a sign bit to overflow/underflow executed data.

The operation and effect of the present invention constructed as above will be described in detail.

The input data IDCT0 to IDCT8, M0 to M7 of adding section 1 are composed of difference signal data and memory data. The difference signal data IDCT0 to IDCT8 includes motion compensation information per block, which is inverse quantized by an inverse quantizer of an image decoder for motion compensation. And, the memory data M0 to M7 is previously stored in a frame memory by a frame. Adding section 1 reads out and adds the data moved as much as motion distance information among the memory data to the input data by utilizing the difference signal data, thereby producing motion-compensated data.

In the embodiment of the present invention, 9-bit difference signal data and 8-bit memory data are added and then the 9-bit added data is reduced to 8-bit sized data. Since a color signal of an HDTV is processed as 8-bit data including a sign bit, every data has a two's complement structure.

FIG. 2 shows an example of the expected result when 4-bit data is added as the form of two's complement.

If the most significant bit (hereinafter referred to as MSB of the added result is converted into "1" from "0" when all MSBs of each data are "0", it is defined as overflow. If the MSB is converted into "0" from "1" when all MSBs of data are "1", it is defined as underflow. The carry and sign bit resultant from each operation can be generated according to the rule of the table of FIG. 3. Where, IMSB corresponds to MSB of difference signal data IDCT0 to IDCT8 per block, and MMSB corresponds to MSB of frame memory data M0 to M7. Output data of adding section 1 is regularly interpreted referring to the table in FIG. 2, and is used in determining the sign bit and detecting the overflow-/underflow. Sign bit determining section 2 determines desired sign bit from the result of adding section 1, based on the table in FIG. 3, and providing the determined sign bit data to latch section 5 as MSB A7. The logical value of sign bit determined by sign bit determining section 2 can be obtained from the state equation utilizing a Karnaugh map which illustrates the conversion of MSB, regardless of carry generated by adding operation.

That is, as shown in FIG. 2, the result of 4-bit data adding is converted into 5-bit data A5 to A1, where, A5 is carry, A4 is sign bit and A3 to A1 is added result data.

Figures 3, 4A, 4B:
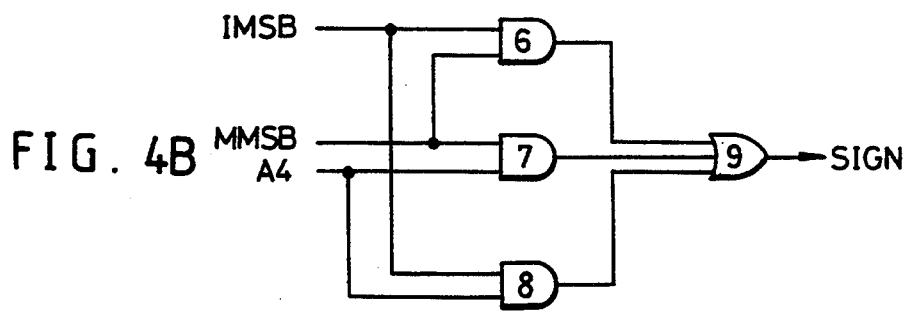
FIG. 3 is a table of the final operated result according to the table of FIG. 2.
FIG. 4A is a Karnaugh map of a sign bit determining logic according to the present invention.
FIG. 4B shows a gate circuit of the logic of FIG. 4A.

Accordingly, the state equation for determining desired sign bit shown in FIG. 3, with respect to MMSB, A4 and IMSB, can be obtained from the Karnaugh map in FIG. 4A. Desired sign bit SIGN can be obtained from the gate circuit embodying the logic equation of SIGN=IMSB*MMSB+IMSB,A4+MMSB,A4. FIG. 4B shows a gate circuit composed of AND gates 6,7,8 and an OR gate 9 of the above logic. Sign bit determining section 2 receives the result from adding section 1 obtained by the above method, thereby determining the sign bit. The determined sign bit enters latch section 5 as MSB A7.

Meanwhile, overflow/underflow checking section 3 receives the result from adding section 1 and then checks overflow (OF=1) and underflow (UF=0) by the logic according to overflow/underflow generating rule shown in FIG. 3. As shown in FIG. 3, overflow is generated if IMSB=MMSB=0 and MSB=1, and underflow is generated if IMSB=MMSB=1 and MSB=0. Accordingly, each logic of overflow/underflow checking section 3 is OF=$\overline{IMSB*MMSB}$*MSB and UF=IMSB*MMSB *$\overline{MSB}$, which is constructed by inverters 10, 11, 12, an AND gate 13 and a NAND gate 14 as shown in FIG. 5.

Moreover, overflow/underflow checking section 3 reduces the size of 4-bit data composed of one sign bit and three data bits A3 to A1 into 3-bit as shown in FIG. 2 and FIG. 3, in order to make the size of the added result and checked result meet 8-bit.

The logic equations are, respectively, OF=$\overline{SIGN}$ *A3 and UF=SIGN *$\overline{A3}$ as shown in FIG. 6A, which are constructed by inverters 15, 16, a NAND gate 17 and an AND gate 18 as shown in FIG. 6B.

Accordingly, when SIGN="0", A3="1" that is, in the case of overflow (OF=1), every output data is made to be "1" and when SIGN="1", A3="0" that is in the case of underflow (UF=0), every output data is made to be "0". The above value can be obtained by performing OR-gating and AND-gating of the overflow/underflow checked result and the checked result in reducing the bit size and by applying the gated result to overflow/underflow executing section 4 as output control signal.

That is, if overflow/underflow checking section 3 checks overflow of the added result or overflow in reducing the bit size from 4-bit to 3-bit, overflow/underflow executing section 4 applies the value of "1" to every output data. And, if overflow/underflow checking section 3 checks underflow of added result or underflow in reducing the bit size from 4-bit to 3-bit, overflow/underflow executing section 4 applies the value of "0" to every output data.

Therefore, overflow/underflow checking section 3 includes an overflow/underflow checking circuit of the added result, an overflow/underflow checked circuit in reducing the bit size, and a circuit for decoding each checked result in order to providing the decoded data into overflow/underflow executing section 4.

According to overflow/underflow checked result supplied into overflow/underflow executing section 4 as stated above, adding section 1 selects 7-bit data to output as the added result. The output data is latched to latch section 5 with the sign bit determined by sign bit determining section 2, thereby being controlled to synchronize their output timing.

That is, overflow/underflow executing section 4 has a logic whose output is "1" in the case of overflow (OF=1) and whose output is "0" in the case of underflow (UF=0).

Figure 7:
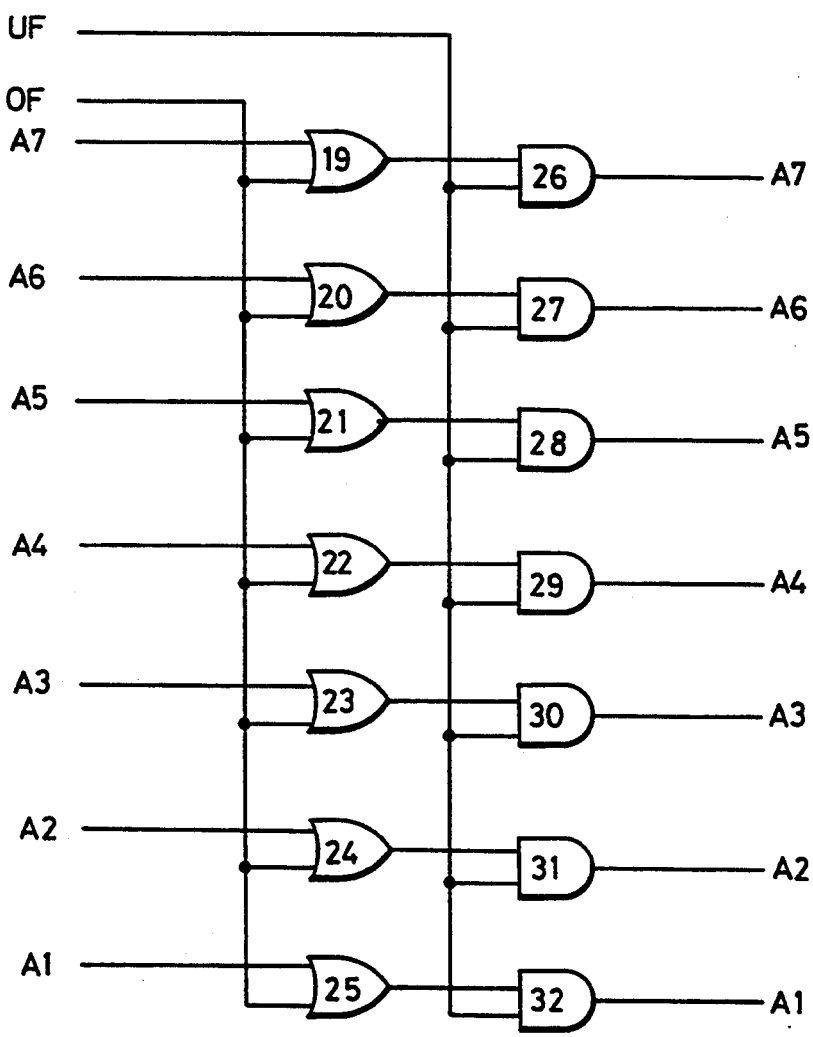
FIG. 7 shows a gate circuit of overflow/underflow executing logic according to the present invention.

FIG. 7 shows a gate circuit of the above logic constructed by OR gates 19 to 25 and AND gates 26 to 32. If overflow is generated, that is, OF=1, UF=1, each of the outputs of OR gates 19 to 25 is 1 and each of the outputs of AND gates 26 to 32 is 1. Meanwhile, if underflow is generated, that is, UF=0, each of the outputs of AND gates 26 to 32 is 0. From the foregoing, a series of signal process, such as adding input data IDCT0 to IDCT8, M0 to M7, detecting overflow, assigning the sign bit and reducing the bit size, can be performed. Therefore, the image decoder of an HDTV can provide image motion compensation information.

Figure 8:
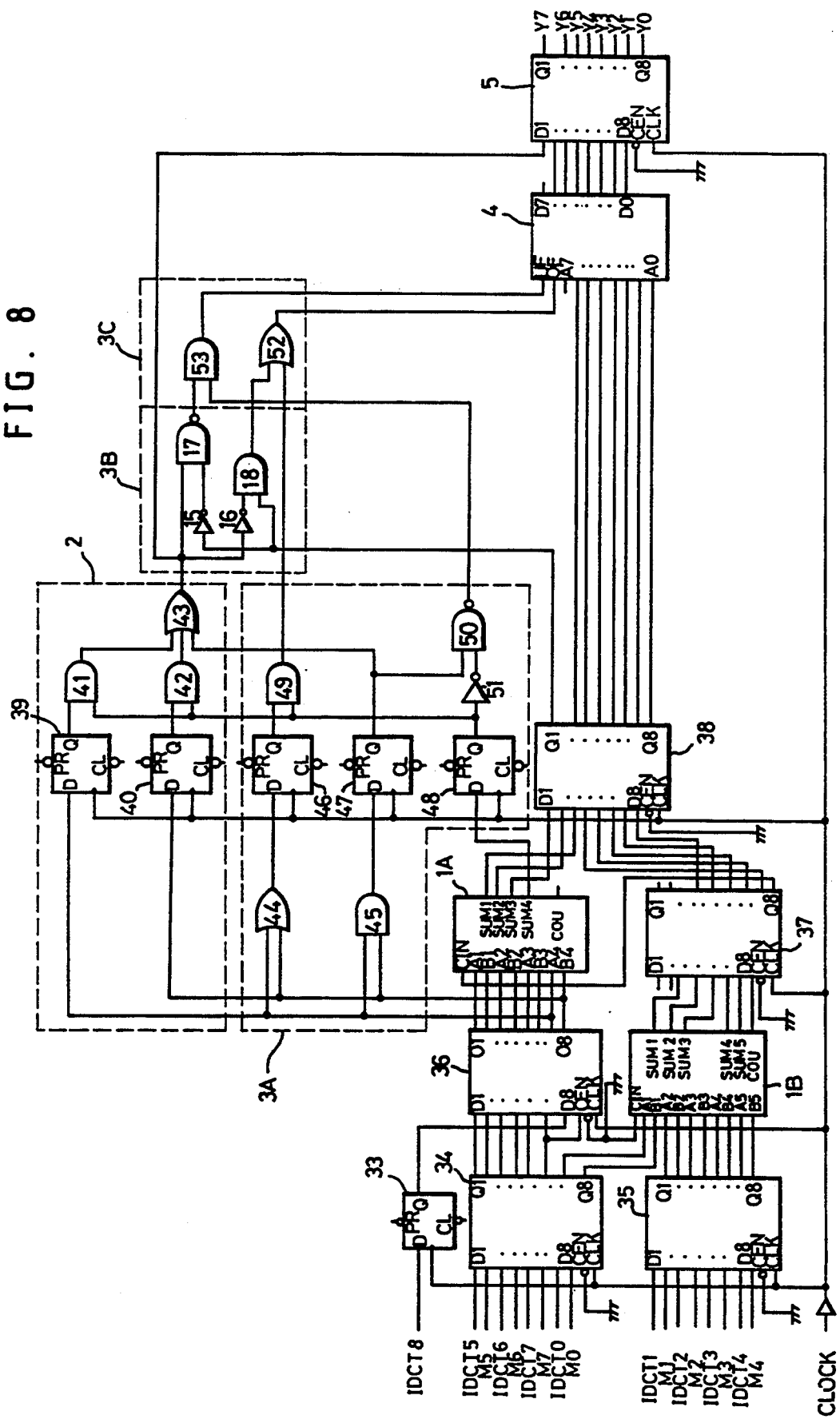
FIG. 8 is a circuit diagram of an embodiment according to the present invention.

With reference to FIG. 8 showing an embodiment according to the present invention, adding section 1 comprises an adder 1A for upper 4-bit data and an adder 1B for lower 5-bit data. Sign bit determining section 2 comprises D flip-flops 39, 40 for latching input data, AND gates 41, 42 for AND gating the output data of the D flip-flops 39, 40, and an OR-gate 43 for OR gating the outputs of AND gates 41, 42 in order to provide final sign bit data SIGN.

Overflow/underflow checking section 3 comprises an overflow/underflow checking circuit 3A of the added result, an overflow/underflow checking circuit 3B in reducing the bit size, and an output controlling circuit 3C for decoding each of the checked results and supplying the decoded data to overflow/underflow executing section 4. The overflow/underflow checking circuit 3A of the added result is constructed by a NOR gate 44, AND gates 45, 49, a NAND gate 50, and an inverter 51, which embody an logic equal to that of FIG. 5, and D flip-flops 46, 47, 48 for synchronizing data processing timing. Output controlling circuit 3C is constructed by OR gate 52 for OR-gating overflows of the checking circuits 3A, 3B and an AND gate 53 for AND-gating underflows of the checking circuits 3A, 3B.

The present invention is also provided with D flip-flops 33, 34, 35 for temporarily storing input data IDCT0 to IDCT8, M0 to M7, D flip-flops 36 and 37 for synchronizing adding timing of the adders 1A, 1B, and a D flip-flop 38 for temporarily storing the final operated result in order to supply it to overflow/underflow executing section 4. Clock for synchronizing the signal processing timing is supplied to each of the D flip-flops.

Input data IDCT0 to IDCT8, M0 to M7 is latched to D flip-flops 33, 34, 35 according to the inputted clock. The output data IDCT0 to IDCT4, M0 to M4 of D flip-flops 34, 35 is summed by adder 1B and then latched to D flip-flop 37. The output data IDCT 5 to IDCT8, M5 to M7 of the D flip-flops 33 and 34 passes through D flip-flop 36 and then added by adder 1A. The outputs of adder 1A and D flip-flop 37 pass through D flip-flop 38 and then are supplied to overflow/underflow executing section 4.

Meanwhile, IMSB (IDCT8) and MMSB(M7) are respectively latched and outputted to D flip-flops 39 and 40 in sign bit determining section 2. And, the sign bit SIGN is determined by the logic constructed by AND gates 41, 42 and an OR gate 43 according to the added result A4 (SUM4) provided from D flip-flop 48 in the overflow/underflow checking circuit. The logic of above gate circuit is equal to that of FIG. 4A. The sign bit SIGN provided from OR gate 43 is supplied to latch section 5, and simultaneously enters overflow/underflow checking circuit 3B in reducing the bit size (see FIG. 6B). Thus, as stated above, each overflow/underflow checked result is respectively provided from AND gate 18 and NAND gate 17. At this point, A3 is made to be the output SUM3 (output Q1 of D flip-flop 38) of adder 1A.

Meanwhile, the overflow/underflow checking circuit 3A of the checked result has a logic equal to that of FIG. 5. That is, if IMSB (IDCT8)=0 and MMSB (M7)=0, the output of NOR gate 44 is "1" so that the value of "0" is latched to D flip-flop 46 and outputted. At this time, if MSB (SUM 4) is "1", "1" is latched to D flip-flop 48 and outputted. Accordingly, the output of AND gate 49 is made to be "1", that is, overflow is generated.

And, if IMSB (IDCT8)=1 and MMSB(M7)=1, the output of AND gate 45 is "1" and latched to D flip-flop 47. At this time if MSB (SUM 4) is "0", "0" is latched to D flip-flop 48. The latched output of "0" is inverted into "1" by inverter 51 and then supplied into NAND gate 50. Accordingly, the output of NAND gate 50 is made to be "0", that is, underflow is generated.

Each overflow and underflow checked by overflow/underflow checking circuits 3A, 3B in this way passes through OR gate 52 and AND gate 53, respectively, and is supplied to overflow/underflow executing section 4.

Accordingly, if the detected result of overflow/underflow checking circuits 3A, 3B is overflow (each output of AND gates 18, 49=1), output of OR gate 52 is "1". If underflow (output of NAND gate 17, 50=0), output of AND gate 53 is "0". Data output control by overflow/underflow executing section 4 according to the output of OR gate 52 and AND gate 53 is described in FIG. 7.

As stated above, the result of overflow/underflow executing section 4 and the sign bit SIGN of sign bit determining section 2 are latched to output latch section 5 as 8-bit data, and are then provided as the final data processing result Y0 to Y7.

From the foregoing, it will be apparent that according to the present invention, a series of data processing such as adding motion compensation information, detecting overflow/underflow, and assigning a desired bit size can be sequentially performed by a simple gate circuit.

While the present invention has been described and illustrated herein with reference to the preferred embodiment thereof, it will be understood by those skilled in the art that various changes in form and details may be made therein without departing from the spirit and scope of the invention.

What is claimed is:

1. An apparatus for processing image motion compensation information for an image processing system comprising:
   means for adding an inverse quantized data for motion-compensation and a frame memory data;
   means for determining a sign bit of added data;
   means for checking overflow/underflow of said added data and reducing the bit size of said added data according to checked overflow/underflow;
   overflow/underflow excuting means for output-controlling said added data according to said checked overflow/underflow; and
   latch means for providing final data by adding said sign bit to overflow/underflow executed data.

2. An apparatus as claimed in claim 1, wherein said sign bit determining means determines a sign bit SIGN and is composed of a logic, SIGN=IMSB*MMSB+IMSB*A4+MMSB*A4, with respect to each of most significant bits IMSB and MMSB of input data of said adding means and the carry data A4 of said added data.

3. An apparatus as claimed in claim 1, wherein said overflow/underflow executing means comprises:
   a plurality of OR gates for providing the value of "1" for all input data if overflow is checked; and
   a plurality of AND gates for providing the value of "0" for all input data if underflow is checked.

4. An apparatus as claimed in claim 1, further comprising a plurality of D flip-flops as a data latch for synchronizing data processing timing of said adding means, overflow/underflow checking means, overflow/underflow executing means and latch means in accordance with an input clock.

5. An apparatus as claimed in claim 1, wherein said overflow/underflow detecting means comprises
   a circuit for checking overflow/underflow of said added data;
   a circuit for checking overflow/underflow in reducing said bit size; and
   an output controlling circuit for decoding each output of said checking circuits and providing a decoded output as an information for controlling output of said overflow/underflow executing means.

6. An apparatus as claimed in claim 5, wherein said overflow/underflow checking circuit of said added data detects overflow OF and underflow UF, respectively, and is composed of a logic, OF=$\overline{\text{IMSB}}$*$\overline{\text{MMSB}}$*MSB, UF=$\overline{\text{IMSB}}$*$\overline{\text{MMSB}}$*$\overline{\text{MSB}}$, with respect to each of most significant bits IMSB, MMSB of input data of said adding means and the most significant bit MSB of said added data.

7. An apparatus as claimed in claim 5, wherein said overflow/underflow checking circuit in reducing said bit size detects overflow OF and underflow UF, respectively, and is composed of a logic, OF=$\overline{\text{SIGN}}$*A3, UF=$\overline{\text{SIGN}}$*A3, with respect to said sign bit SIGN and the most significant bit A3 of said added data.

8. An apparatus as claimed in claim 5, wherein said output controlling circuit comprises:
   an OR gate for OR-gating overflows checked by said checking circuits; and
   an AND gate for AND gating underflows checked by said checking circuits.

* * * * *